Patented June 25, 1929.

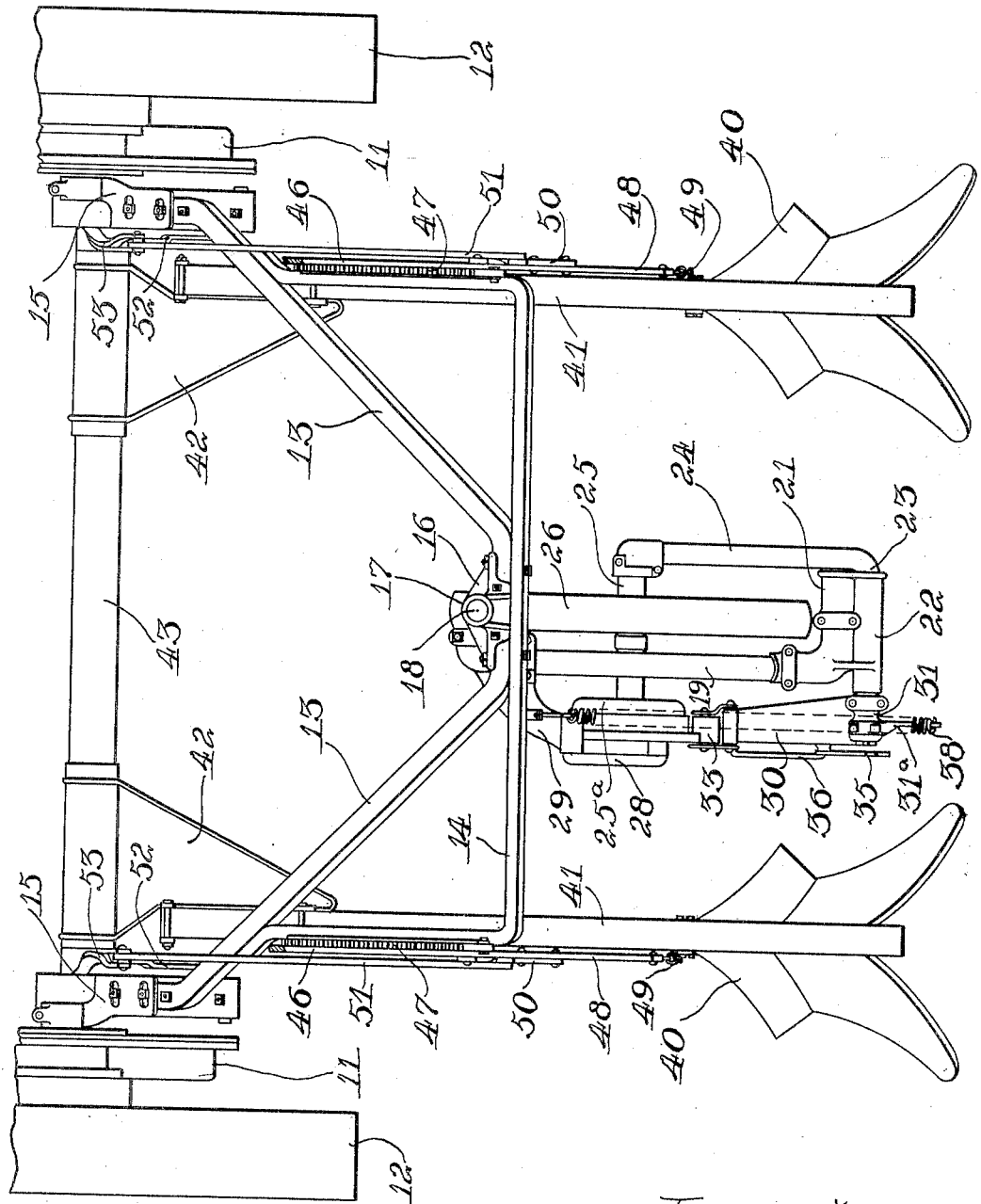

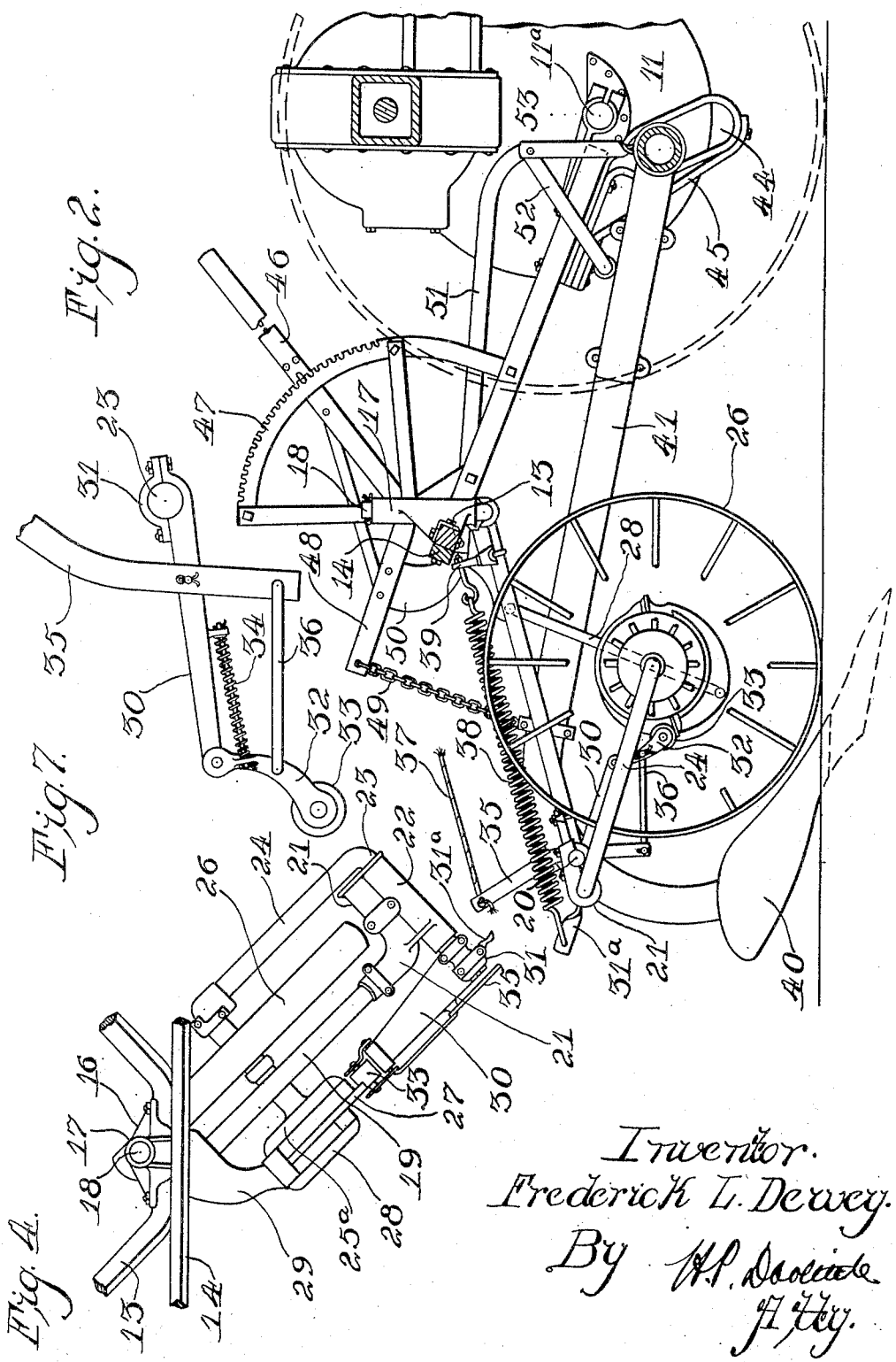

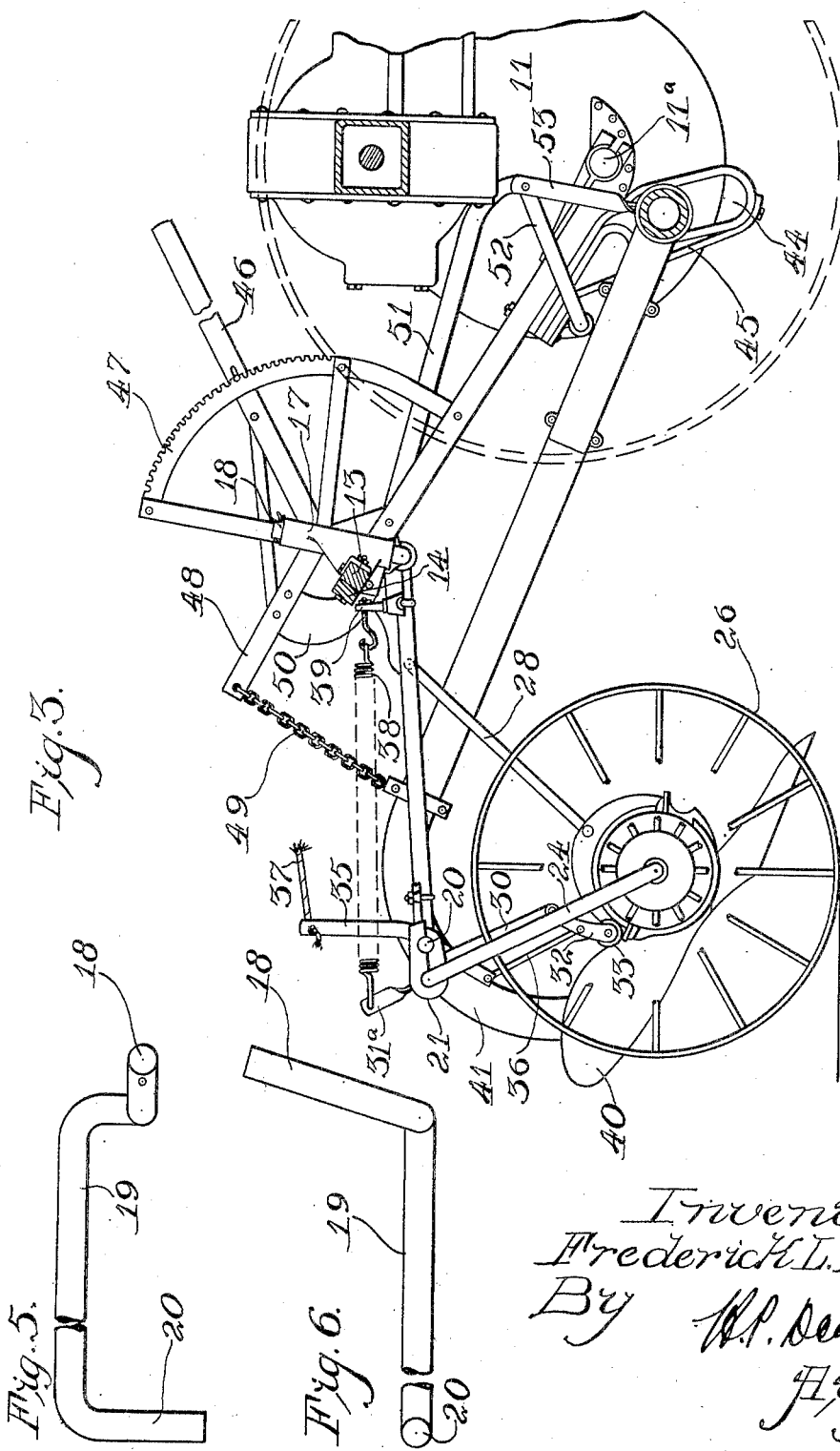

1,718,780

UNITED STATES PATENT OFFICE.

FREDERICK L. DEWEY, OF CANTON, ILLINOIS, ASSIGNOR TO INTERNATIONAL HARVESTER COMPANY, A CORPORATION OF NEW JERSEY.

TRACTOR IMPLEMENT ATTACHMENT.

Application filed April 14, 1927. Serial No. 183,685.

This invention relates to implement attachments for tractors and to the provision of traction actuated lift mechanism for such attachments.

The main object of the invention is to provide an implement attachment having a traction actuated power lift unit comprising a ground engaging support forming part of the attachment and arranged with respect to the tractor wheels so as to facilitate row crop work. Another object is to provide a self contained power lift unit which may be added to implement attachments already in use. A further object is to provide a power lift unit of the type stated capable of swiveling movement with respect to the tractor attachment in which it is embodied and therefore offering no interference to short turns of the tractor and implement attachment.

In the particular embodiment of the invention herein illustrated, the above, and other minor objects and advantages, have been attained by providing an implement attachment comprising a floating frame connected to the rear of a tractor and equipped with a power lift device comprising a ground engaging wheel journaled on a support which is pivoted to the floating frame on a vertical axis.

The invention accordingly resides in the construction and arrangement stated and in the sub-combinations and details of construction hereinafter more particularly described and claimed.

Referring to the drawings,—

Fig. 1 is a plan view showing a plow attachment for tractors embodying the invention;

Fig. 2 is a side view of the attachment shown in Fig. 1 with the rear of the tractor shown in section, the lift being in lowered position;

Fig. 3 is a similar side view with the lift in raised position;

Fig. 4 is an enlarged plan view of the lift unit only;

Figs. 5 and 6 are detail views of the main supporting member of the lift unit; and Fig. 7 is a detail view showing the trip mechanism for the power lift.

In its present embodiment the invention is disclosed in a combination including a row crop type of tractor, the wheels of which straddle two plant rows, only the rear axle structure of which is shown on the drawings. This axle structure may consist of an elevated transverse housing 10 having depending housings 11 fixed to its ends. On the outer sides of the housings the traction wheels 12 are mounted. These housings enclose the differential and reduction gearing transmitting the drive to the traction wheels.

On the inner faces of the depending housings 11 there are inwardly projecting bearing studs or pintles 11$^a$. These are preferably located low down on the housings 11 and directly under the transverse housing 10. On these pintles there is pivoted a rearwardly extending implement supporting frame which may comprise rearwardly converging members 13 which are secured to a U-shaped member 14 in the manner illustrated in Fig. 1. The forward ends of the members 13 extend in parallel relation and carry laterally shiftable journal brackets 15 which are mounted on the studs 11. Thru provision of slot and bolt connections with the members 13 these brackets may be readily connected to and disconnected from the pintles together with the implement frame and implements carried thereby. There is thus provided a readily detachable floating supplemental frame having a lateral width sufficient to extend over two adjacent plant rows. Centrally of the transverse member 14 of this frame there is secured by suitable means, a bracket 16 having a substantially upright bearing sleeve 17. This sleeve receives an angularly extended end or arm 18 on a main caster wheel frame bar 19. Bar 19 extends rearwardly and has its other end 20 extended laterally at a right angle, as best seen in Figs. 5 and 6, and said end 20 is clamped to a second bearing bracket 21 which, in effect, forms part of the member 19. The bracket 21 is provided with a horizontal bearing sleeve 22 which receives the angularly extended end 23 of a crank shaft 24 which extends forwardly and downwardly with respect to bar 19 and is provided with another angular extension at its lower end projecting in the same direction as and parallel to the end 23 which is journaled in the sleeve 22. This extension serves as a spindle or journal for a hub or sleeve 25 to which a supporting wheel 26 is fixed. The end of sleeve 25 away from the crank axle 24 is enlarged to form a bell shaped member 25$^a$ forming the constantly rotated section of a half revolution clutch of the type commonly used in traction actuated implement lifts. The other, or intermittently rotated section of the clutch comprises a disk shaped member 27 suitably journaled adjacent the member 26 and on the same spindle. A lifting and lowering link 28 is eccentrically pivoted at its lower end to the clutch disk 27 and at its upper end is pivoted to a fixed laterally extended arm or bracket 29 which preferably is clamped on member 19. In substantially the same vertical plane as the clutch, there is provided an arm 30 which is fixed on the end of the crank shaft extension 23 projecting beyond sleeve 22 as by clamps 31. The arm 30 extends to a point adjacent the clutch and its end carries the usual pivoted trip dog 32 provided with roller 33 for engagement with the opposite depressions in the clutch disk member 27. As best seen in Fig. 7, the trip dog is pressed towards the clutch by a compression spring 34 interposed between abutments on the dog and on arm 30. A trip lever 35 pivotally mounted on arm 30 and connected by a link 36 to the trip dog serves to actuate the trip thru a pull rope 37 extending to the operator's station on the tractor. It will be understood that each actuation of the clutch imparts a half revolution to disk 27 thereby lifting and lowering the frame, as seen in Figs. 2 and 3, and as usual in this type of mechanism.

Preferably, one of the clamps 31 is formed with an extension 31ª which serves as anchorage for one end of a tension spring 38 the other end of which is fastened to an abutment 39 on bracket 29 at the upper end of member 19. This spring serves to assist the downward swing of the crank shaft 24 to lift the implement frame and to cushion its drop when lowering.

It will be noticed that the angle of the extension 18 with the main bar of member 19 is such as to allow the supplemental frame to retain an upwardly inclined position with respect to its connections to the tractor, thus affording ample space, when lowered, for implements located beneath it.

The structure so far described provides a floating supplemental frame which is supported at the rear on a trailing swiveled ground engaging support, which support includes self contained power lift mechanism, the support being so located on the supplemental frame as to engage the ground at a point corresponding to the space between adjacent rows straddled by the tractor.

The supplemental frame may carry any suitable ground working or root crop harvesting implements. As illustrating one arrangement particularly well adapted to the frame and lift described there is shown two middle breaker plows 40, one at each side of the trailing power lift unit, which plows have forwardly extending beams 41 connected by coupling brackets 42 to a transverse draft bar 43 the ends of which are supported in elongated openings 44 formed in supporting brackets 45 fixed on the under sides of the arms of the supplemental frame near the points of attachment to the tractor. Each beam is suspended from the supplemental frame by vertically shiftable connections comprising a bell cranked lever 46 pivoted on the frame just above the beam and having latch mechanism co-operating with the usual locking rack 47. The rearwardly projecting arm 48 of the lever is connected to the rear of the plow beam by a flexible element, or chain, 49 and to the front end of the beam thru a fixed extension 50, below arm 48, to which is pivoted one end of a link 51 extending forwardly and pivoted at the other end to a rock arm 52 pivoted on bracket 45. The ends of this rock arm and of link 51 carry a suspension link 53 supporting one end of the transverse draft bar 43. This arrangement permits each plow beam to be independently lifted and lowered or adjusted bodily within the range of guide openings 44 and the plows will, of course, be lifted with the frame under actuation of the power lift device. The particular implement suspension structure just described forms the subject matter of a copending application of Benjamin, S. N. 731,104 filed August 4, 1924, issued September 25, 1928, as Patent No. 1,685,267.

In operation the tractor and attachment are driven to or from the field and turned at the headlands with the frame and tools elevated as in Fig. 3. As the wheel 26 is free to caster on the axis of spindle 18 no interference with short turns of the tractor will occur. When the tractor is in position for work, a pull on rope 37 as travel begins operates to lower the supplemental frame and connected implements to the position shown in Fig. 2 after which the implements may be adjusted for depth by levers 46.

The invention accordingly provides a simple supplemental frame attachment for tractors which attachment embodies a traction actuated lift so constructed and arranged as to offer no interference with row crop work and greatly facilitates handling of the connected implements and the tractor. It is contemplated that variations in the structure disclosed may be made within the scope of the following claims.

What is claimed is:

1. The combination with the rear axle structure of a tractor, of a floating supplemental frame hinged to the axle structure on a horizontal axis, means for lifting and lowering the frame comprising a centrally positioned ground engaging supporting means having a swiveled connection with the end of the frame remote from its hinged connection to the tractor, said supporting means including traction actuated lift mechanism, and ground engaging implements located at each side of the supporting means and having draft connections with the forward portion of the frame.

2. The combination with the rear axle structure of a tractor, of a floating supplemental frame hinged to the axle structure on a horizontal axis and extending rearwardly therefrom, and means for lifting and lowering the frame comprising a bar swiveled on a substantially upright axis to the rear portion of said frame and extending to the rear thereof, a ground wheel journaled on a support connected to said bar for vertical movement, and means actuated by said wheel for effecting said vertical movement.

3. The combination with the rear axle structure of a tractor, of a floating supplemental frame hinged to the axle structure on a horizontal axis and extending rearwardly therefrom, an upright bearing sleeve on the rear of said frame, a bar having one end swiveled in said sleeve and extending rearwardly and downwardly from the frame on a plane at an obtuse angle to the plane of the frame, a ground engaging wheel mounted on the other end of said bar by means allowing vertical movements of the wheel relatively to the bar, and means actuated by said wheel for effecting said movements.

4. The combination with the rear axle structure of a tractor including traction wheels widely spaced laterally, of a supplemental frame hinged to the axle structure on a horizontal axis and having a transverse portion spanning the greater part of the space between said wheels, means for lifting and lowering the frame comprising ground engaging supporting means swiveled on the frame on a substantially upright axis and on a line extending midway between said wheels, said supporting means including traction actuated lift mechanism, and tillage implements symmetrically disposed at each side of the supporting means and within the tread lines of the traction wheels and having draft beams connected to the forward portion of the frame.

5. The combination with a row crop tractor having an upright arched rear axle structure adapted to span a plurality of plant rows, of a floating supplemental frame having arms hinged on a horizontal axis to the depending members of said arched axle and spanning the space therebetween, said frame extending rearwardly, and means for lifting and lowering said frame comprising a ground engaging support having an upright swiveled connection with said frame on the rear end thereof and on a line extending midway between its arms, a vertically shiftable wheel journaled on said support, and means actuated by said wheel for shifting it to lift and lower the frame.

6. A castering power lift unit comprising the combination of an attaching bracket, a main frame member having a rigid upstanding spindle swiveled in the bracket and a fixed elongated portion trailing therefrom, a cranked axle horizontally pivoted on the outer end of said member and extending towards the bracket, a ground wheel journaled on the forward end of the cranked axle, and traction actuated lift mechanism connecting said wheel with the main frame member.

In testimony whereof I affix my signature.

FREDERICK L. DEWEY.